United States Patent Office 2,997,430
Patented Aug. 22, 1961

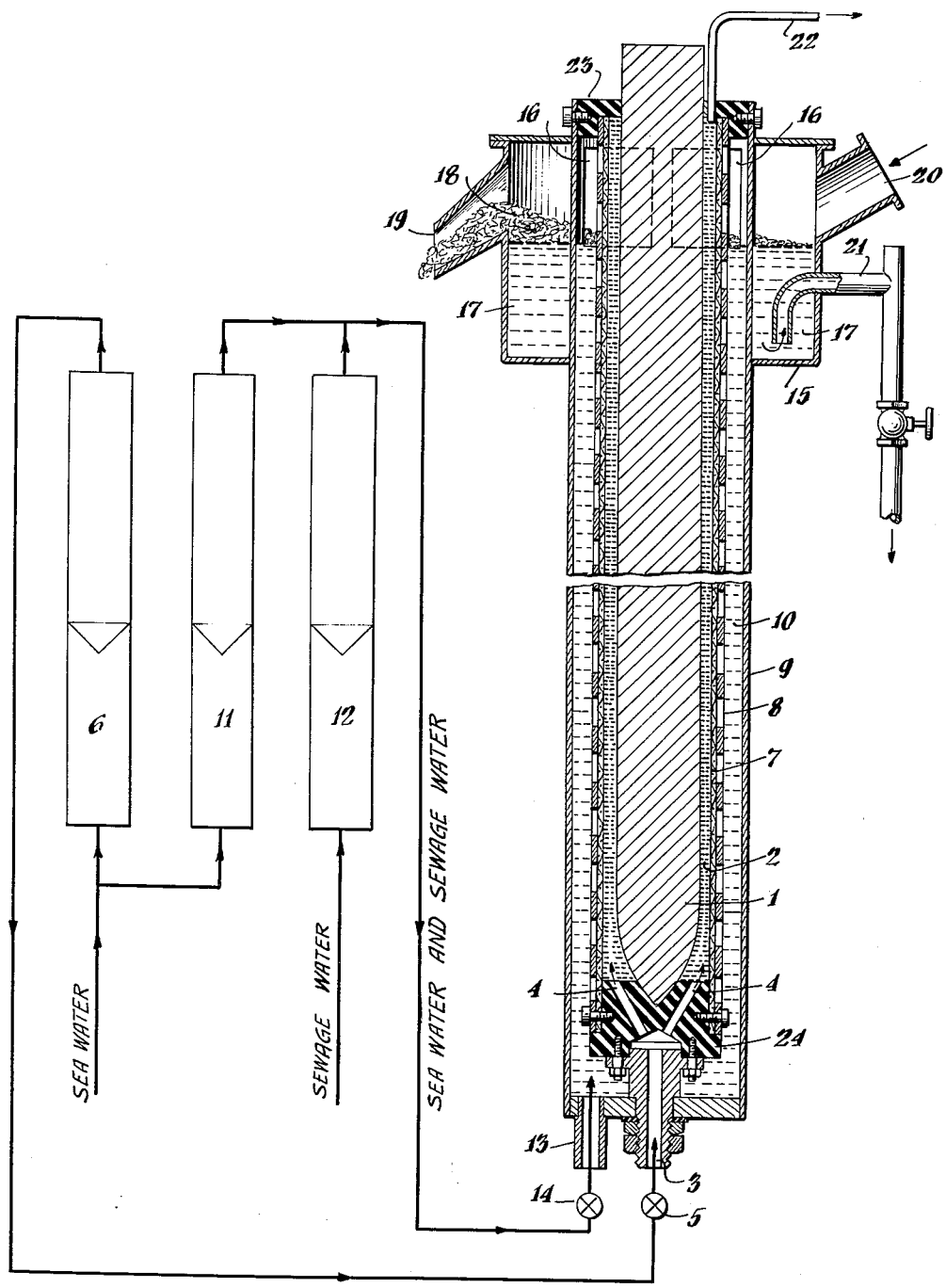

2,997,430
METHOD OF PURIFYING SEWAGE-WATER
Johan Ernst Fredrik Föyn, Bestun, Oslo, Norway, assignor to Elektrokemisk A/S, Oslo, Norway, a corporation of Norway
Filed June 20, 1958, Ser. No. 743,462
Claims priority, application Sweden Feb. 14, 1955
5 Claims. (Cl. 204—151)

This application relates to a method of precipitating and extracting fertilizer ingredients from what may be termed "sewage waters," that is, sewage from which a greater portion of the solids have been removed, as for example, by filtration. The invention is aimed primarily to precipitating and removing substances which ordinarily are dissolved in these waters and which have fertilizer value, consisting principally of phosphates and also some ammonia compounds.

Ordinarily the object of sewage treatment is to remove solids and let the fully dissolved ingredients be discharged in the water. This is not only wasteful of valuable fertilizer chemicals but it has been found that if this sewage water is discharged into other bodies of water such as rivers, lakes or ocean water, the fertilizer ingredients of the sewage tend greatly to stimulate the growth of algae and plankton. The algae by their death and decay consume the oxygen dissolved in the water which results in the death of the fish and the algae mud also makes the water opaque and unpleasant. As an incident to the removal of the soluble fertilizer ingredients it has been found that this process also helps to remove very fine suspended particles which tend to make the sewage water turbid and give it undesirable color.

In carrying out this process the sewage from which most of the solids have been removed as by straining or filtering, is mixed with a solution comprising soluble magnesium salts of which the simplest source is sea water and then is continuously passed through the cathode compartment of an electrodialysis cell while preferably additional quantities of sea water are passed through the cell on the anode side of the diaphragm. It has been found that under the action of the electric current passing through the cell the cathode compartment will become quite strongly alkaline with the release of hydrogen and the formation of ammonia and some hydroxyl radicals. The electrolysis should be sufficient to cause the cathode compartment to reach a pH of 9.5 or higher. These radicals in the cathode compartment will combine with the magnesium from the sea water and at the same time will react with the phosphates present in the sewage water to precipitate insoluble salts principally $MgNH_4PO_4$. At the same time some $Mg(OH)_2$ will also be formed. The $MgNH_4PO_4$ and $Mg(OH)_2$ will form a flocculent precipitate which tends to float on the surface of the liquid, and the evolution of hydrogen in the cathode cell will tend to act as an air lift to bring the precipitated matter to the surface. It will also be found that the precipitated magnesium compounds, particularly the magnesium hydroxide, have strong occluding abilities and at the time of their precipitation they will occlude suspended minute particles from the sewage water and thereby the sewage water will be further cleansed.

It is a particular feature of this invention that the material which are sought to be eliminated and recovered by this particular process are caused to float to the surface where they may be skimmed off and readily removed so that further tedious filtering of the mass of sewage water is not required.

In carrying out the invention the sewage water is mixed with at least 5% of its volume of sea water and this amount may be increased up to as much as 20%. This top value is not critical but if more than about 20% of sea water is used the amount of sewage water that can be treated in a given cell is unduly reduced. It is also desirable that sea water be included in the anode compartment in addition to that mixed with the sewage water, as this will cause further quantities of alkaline ingredients to be released and passed through the diaphragm of the cell increasing the alkalinity in the cathode compartment and increasing the magnesium concentration without unduly diluting the material under treatment in that cell. It is preferred to have pure sea water in the anode compartment and in such case the water leaving the anode compartment by its concentration of chlorine and oxygen will have disinfecting qualities and it may be mixed with the water purified in the cathode compartment. However, if desired, water from the cathode compartment may be returned to the anode compartment with or without the addition of sea water. This, however, may tend somewhat to reduce the electrical conductivity of the anolyte which would demand more electrical energy. If desired some alkaline material such as burnt lime or dolomitic limestone may be added to the sewage water either before or after its mixture with sea water and before its introduction into the cathode compartment. This may somewhat reduce the electrical requirements. It has also been found advantageous in some instances to blow some air into the cathode compartment further to assist in raising the precipitated magnesium compounds to the surface.

If all the alkali required for precipitation is produced by electrolysis of the sewage water there may be assumed an ampere hour consumption of 200–300 a.h./m.$^3$ of sewage water. However, by the addition of soda or lime to the water to give a pH of 9 or higher, the consumption of electricity can be reduced to between 50 and 200 ampere hours. If dolomitic limestone is used this will supply additional quantities of magnesium as well as calcium. The limestone preferably is burnt and may be supplied in the form of milk of lime.

This invention may be readily understood from the following illustrative example taken in conjunction with the accompanying drawing which shows diagrammatically a cell and accompanying equipment for carrying out the invention.

First, as to the apparatus, the numeral 1 designates the anode which may consist of, for instance, graphite 2 is the anode compartment into which sea water is introduced through the central pipe 3 and distributing pipes 4. The supply of water to the central pipe 3 is controlled by means of a valve 5 and the amount of water is measured in the rotameter 6. The anode 2 is surrounded by a diaphragm 7 which as shown is made of any desirable form of fabric such as canvas, nylon, asbestos cloth or the like. The diaphragm 7 may be supported by a frame member 8 in the form of perforated sheet iron. The outer casing 9 of the device serves as the cathode and between the diaphragm 7 and the cathode 9 is the cathode compartment 10. This is filled with a mixture of sewage water and sea water which are measured in rotameters 11 and 12 and supplied to the cathode compartment through the pipe 13. The supply is controlled by the valve 14.

The upper part of the compartment 10 is surrounded by an annular vessel 15 into which the purified sewage water from the cathode compartment flows through openings 16 at the top of the cathode compartment. In this vessel separation takes place and the foam 18 which is carried upward by the rising hydrogen flow, collects on the top of the purified water 17 and is removed in any desired manner as by mechanical means or by injection of air through the opening 20 which causes the foam to be discharged through pipe 19. The purified water is led out from the pipe 21 and water from the anode compartment is led out through the pipe 22. 23 and 24 are insulating members closing the ends of the anode compartment and insulating the anode from the rest of the metallic structure.

An example of the operation of the process is as follows. Sewage water from which the bulk of the solids had been removed was mixed with between 10% and 15% of sea water by the use of the rotameters 11 and 12. The mixture was introduced into the cathode compartment through the pipe 13 and simultaneously pure sea water was led into the anode compartment. Direct current was passed through the cell by ordinary connections to the electrode which are not shown in the drawing. It was found that precipitation of solids took place in the cathode compartment and these were floated into the vessel 15 where the floated matter was blown off by air admitted through the pipe 20. The solids were collected at the spout 19 and on analysis it was found that the solids were made up largely of $MgNH_4PO_4$ mixed with $Mg(OH)_2$ and occluded solid particles from the sewage water.

During the operation of the process the flow of sewage was so regulated that a period of about 25 minutes was consumed from the time the sewage water mixed with the sea water entered the cell until the purified water left the cell. The current density at the anode was 3 a./d.m.$^2$ and the voltage was 10 v. The current consumption was around 200 a.h./m.$^3$ sewage.

An analysis of the water passing out of the pipe 21 showed that the content of phosphates was reduced from about 5 mg. per liter to around 0.2 mg. per liter, that is, in the order of about 90% had been removed. The turbidity of the sewage determined by photoelectrical measurements of the reduction of penetration of light through the liquid showed an increase from around 2.5 millivolts in the raw sewage to around 8.5 millivolts in the purified sewage as registered by a millivolt meter. For comparison it may be mentioned that the corresponding measurement of light penetration of distilled water gave an amplitude of 10 millivolts under like test.

The foam materials discharged from the pipe 19 can be dried in any desired way as by draining the liquid out and then driving off additional water with heat. The residue is found to be valuable as a fertilizer, since this residue, in addition to valuable humus, contains nitrogen and a phosphate content which is found to be three times that of dried cattle manure.

It is usually found desirable to discharge the water from pipe 21 adjacent the discharge from the pipe 22 so that the anode water containing high percentages of chlorine and oxygen will tend to disinfect the cathode water.

It will be noted that this process differs from the ordinary bacteriological process of treating sewage now commonly used, in that the latter aim at the partial liquefaction of solid ingredients whereas my process goes in the opposite direction and aims to cause precipitation to take place. This process eliminates soluble matters from the water which should be removed, and the ability of the magnesium compounds to occlude the fine particles in the water helps to reduce turbidity with great rapidity. For example, in the usual biological methods sewage sludge is left for at least 5 to 10 hours in open containers for fermentation by contact with the air, whereas in my process the chemical precipitation caused by the electrolytic action takes place in a continuous process in a period of not over half an hour. From this it will be seen that my process not only is adapted to produce valuable phosphate compounds from the sewage water that formerly were wasted, but the very fact of removing these compounds from the sewage water renders this water much less harmful when run into rivers or lakes or into the sea.

This application is a continuation-in-part of my earlier application, Serial No. 563,785, filed February 6, 1956, now abandoned.

What I claim is:

1. The method of separating from sewage water phosphates available for use as fertilizer which comprises straining sewage to remove solid material, mixing the liquid residue with at least 5% by volume of sea water, passing such mixture through the cathode compartment of a dialysis cell which also has sea water in the anode compartment, retaining the sewage water mixture in the cathode compartment until the solution therein reaches a pH of at least 9.5 whereby compounds comprising $MgNH_4PO_4$ are precipitated and caused to rise to the surface of the sea water-sewage water residue and separating such material from the surface of the liquid.

2. A process as specified in claim 1, in which the sea water-sewage water residues from the cathode compartment are led through the anode compartment where such residues are subjected to the action of chlorine generated in such compartment.

3. A method as specified in claim 1, in which the liquid residue of the sewage obtained after straining the sewage to remove solid material is mixed with between 10% and 15% of its volume of sea water.

4. The process as specified in claim 1 characterized by the fact that the sewage water before being introduced into the cathode compartment is rendered alkaline by the addition of alkaline material comprising magnesium compounds.

5. The method of separating phosphates from solution in sewage water which comprises adding to the sewage water a solution of magnesium salts, treating such mixture in the cathode compartment of an electrolytic cell provided with a diaphragm until the pH of the solution rises above 9.5 and until $MgNH_4PO_4$ is precipitated and rises to the surface and then removing such precipitate from the surface of the cell.

References Cited in the file of this patent

UNITED STATES PATENTS

| | | |
|---|---|---|
| 398,101 | Webster | Feb. 19, 1889 |
| 1,139,778 | Landreth | May 18, 1915 |
| 2,158,595 | Slagle | May 16, 1939 |